United States Patent
Folk et al.

(10) Patent No.: US 9,010,371 B2
(45) Date of Patent: Apr. 21, 2015

(54) ANTI-CAVITATION VALVE SEAT

(71) Applicant: Cla-Val Co., Costa Mesa, CA (US)

(72) Inventors: Robert Folk, Laguna Beach, CA (US);
David Becker, Anaheim, CA (US)

(73) Assignee: Cla-Val Co., Costa Mesa, CA (US)

( * ) Notice: Subject to any disclaimer, the term of this patent is extended or adjusted under 35 U.S.C. 154(b) by 252 days.

(21) Appl. No.: 13/689,604

(22) Filed: Nov. 29, 2012

(65) Prior Publication Data

US 2013/0153808 A1    Jun. 20, 2013

Related U.S. Application Data

(60) Provisional application No. 61/576,512, filed on Dec. 16, 2011.

(51) Int. Cl.
| | |
|---|---|
| *F17D 3/00* | (2006.01) |
| *F16K 47/08* | (2006.01) |
| *F16K 25/00* | (2006.01) |
| *F16K 1/42* | (2006.01) |
| *F16K 31/02* | (2006.01) |

(52) U.S. Cl.
CPC ......... *F16K 25/005* (2013.01); *Y10T 29/49407* (2015.01); *F16K 31/02* (2013.01); *F16K 47/08* (2013.01); *F16K 1/42* (2013.01)

(58) Field of Classification Search
CPC ...... F16K 1/42; F16K 47/08; Y10T 29/49407
USPC ................. 251/127; 137/269, 271, 1, 625.33, 137/625.37, 625.28
See application file for complete search history.

(56) References Cited

U.S. PATENT DOCUMENTS

| | | | |
|---|---|---|---|
| 1,307,986 A | 6/1919 | Randall et al. | |
| 1,383,005 A | 6/1921 | Mertens | |
| 3,117,590 A | 1/1964 | Nelson et al. | |
| 3,157,200 A | 11/1964 | Rowan | |
| 3,330,294 A | 7/1967 | Manning | |
| 3,540,484 A | 11/1970 | Brown | |
| 3,693,659 A | 9/1972 | Parola | |
| 3,722,854 A * | 3/1973 | Parola | 251/127 |
| 3,776,278 A | 12/1973 | Allen | |
| 3,802,537 A * | 4/1974 | White | 181/226 |
| 3,813,079 A | 5/1974 | Baumann et al. | |
| 3,917,221 A * | 11/1975 | Kubota et al. | 251/127 |
| 3,954,124 A * | 5/1976 | Self | 138/42 |
| 3,990,475 A | 11/1976 | Myers | |
| 4,022,423 A | 5/1977 | O'Connor et al. | |
| 4,024,891 A | 5/1977 | Engel et al. | |
| 4,180,100 A | 12/1979 | Kolb et al. | |

(Continued)

OTHER PUBLICATIONS

Singer Valve Inc., Model 106-PG Main Valve with Anti-Cavitation Trim / Control Valve; Catalog, Jun. 2002.

*Primary Examiner* — John Bastianelli
*Assistant Examiner* — Seth W Mackay-Smith
(74) *Attorney, Agent, or Firm* — Kelly & Kelley, LLP

(57) ABSTRACT

An anti-cavitation seat which is disposable between an inlet and an outlet of a pressure reducing valve, and including a plurality of inlets causing fluid to flow into a converging pathway to reduce pressure of the fluid. The inlets form a tortuous path for a portion of the fluid flowing into the anti-cavitation seat, so as to further reduce the pressure of the fluid. A standard stem assembly is used in conjunction with the anti-cavitation seat to alter the flow of fluid through the valve.

39 Claims, 6 Drawing Sheets

(56) References Cited

U.S. PATENT DOCUMENTS

| | | | |
|---|---|---|---|
| 4,249,574 A * | 2/1981 | Schnall et al. | 137/625.3 |
| 4,375,821 A | 3/1983 | Nanao | |
| 4,384,592 A | 5/1983 | Ng | |
| 4,397,331 A | 8/1983 | Medlar | |
| 4,473,210 A * | 9/1984 | Brighton | 251/127 |
| 4,567,915 A | 2/1986 | Bates et al. | |
| 4,617,963 A | 10/1986 | Stares | |
| 4,650,155 A | 3/1987 | Liantonio | |
| 4,693,450 A | 9/1987 | Paetzel | |
| 4,825,906 A | 5/1989 | Hartman | |
| 4,860,993 A | 8/1989 | Goode | |
| 4,921,014 A | 5/1990 | Tartaglia et al. | |
| 5,018,703 A | 5/1991 | Goode | |
| 5,769,123 A | 6/1998 | Heestand et al. | |
| 5,964,248 A | 10/1999 | Enarson et al. | |
| 6,394,134 B1 | 5/2002 | Kwon | |
| 6,935,371 B2 | 8/2005 | Stares | |
| 7,152,628 B2 | 12/2006 | Folk et al. | |

* cited by examiner

ANTI-CAVITATION VALVE SEAT

BACKGROUND OF THE INVENTION

The present invention generally relates to control valves in high pressure fluid transfer systems, such as waterworks systems. More particularly, the present invention relates to an anti-cavitation seat for use in control valves so as to impart anti-cavitation and low-noise properties.

Main valves, such as that illustrated in FIG. 1, are regularly used in high pressure fluid transfer systems, such as waterworks systems. Such main valves, generally referred to by the reference number 10, are also referred to as basic valves, flow control valves, and pressure reducing valves and the like. These valves include a body 12 defining a fluid inlet 14 and a fluid outlet 16, generally on opposite ends of the body 12. The inlet 14 and outlet 16 are operably connected to piping or the like so as to deliver the fluid in a controlled manner. A seat 18 is disposed between the fluid inlet 14 and outlet 16, and in conjunction with a stem assembly controls the water flow through the valve 10. In order to open and close the valve 10, and control the flow of water therethrough, a cover 20 is secured to the body 12 and with a diaphragm 22 defines a pressure chamber 24. Fluid is moved into and out of the pressure chamber 24, causing the diaphragm 22 to flex outwardly towards the seat 18 and inwardly into the pressure chamber 24.

A stem assembly includes a stem 26 which extends through a diaphragm washer 28, on one side of the diaphragm 22 and a disc retainer 30 having a disc 32, which engages an upper lip of the seat 18 in order to close the valve 10. When the pressure in the pressure chamber 24 proportionally less than the pressure at the valve inlet 14, the pressure forces overcome spring 38 forces which biases the diaphragm washer 28, diaphragm 22, disc retainer 30 and disc 32 upwardly into the pressure chamber 24, thus opening the valve 10. However, when the fluid pressure within the pressure chamber 24 is equal to or greater than the valve inlet 14 pressure and valve outlet 16 pressure, as illustrated in FIG. 1, the fluid pressure assists the force of the spring 34 and moves the diaphragm 22, and thus the associated diaphragm washer 28, disc retainer 30, and disc 32 towards the seat 18, until the disc 32 engages the upper lip of the seat 18, as illustrated, in order the close the valve 10. Thus, the diaphragm 22, stem 26, diaphragm washer 28, disc retainer 30 and disc 32 slidably move with each other relative to the seat 18 in order to open and close the valve. The interplay between the fluid within the valve 10, the strength of the spring 34, and the pressure applied to the pressure chamber 24 dictate the degree which the valve 10 is opened or closed, and thus the amount of fluid which is allowed to pass through the valve 10 downstream.

When subjected to high-pressure differentials or high flow rates, valves often exhibit excessive noise and vibration. This is usually attributable to the phenomenon of cavitation, which can range from relatively harmless levels called incipient cavitation to significantly more acute levels that actually damage valves and related piping. This can be loud enough to cause hearing loss in plant personnel if subjected to it for extended periods of time.

Cavitation occurs if the velocity of the fluid in the valve seating area becomes excessive, creating a sudden severe reduction in pressure that transforms the liquid into a vapor state, resulting in the formation of literally thousands of minute bubbles. The subsequent decrease of velocity and pressure rise that occurs after the valve seating area, when the pressure rise condition resumes, causes these vapor bubbles to collapse at the rate of many times per second. Should this occur in close proximity to any metal surface, damage can take place. Over time, this can lead to valve failure due to the vibration and/or erosion. Minimizing or eliminating these conditions that adversely affect operation and service life of the valve continues to be one of the most serious challenges encountered in the daily operation of a water distribution system, such as municipal water systems and the like.

To overcome the adverse effects of the orifice action of the valve, it has become common practice to design the valve so as to break up the flow through the valve into a multitude of small streams which are then led through convoluted paths to produce energy losses in the fluid. Such designs are known as torturous fluid flow redirection. Valve assemblies are known, such as those produced by Ross Valve Manufacturing Company Inc., which utilize aligned plates that serve to suppress vibration, pressure fluctuations, cavitation and noise. For example, an upstream corrugated plate may be selectively slid into place to control the flow. A downstream plate having a plurality of apertures creates a plurality of jets which reduces the pressure flow through the set of plates. However, the number and size of aperture in the plates, the number of plates, and their spacing are determined by fluid flow, and varying flows can make such orifice plates ineffective.

Yet other valve assemblies are known in which interfacing canisters having apertures form a tortuous fluid path are also known. For example, Singer Valve Inc. offers an anti-cavitation trim having interconnecting canisters with a plurality of small round apertures which overcomes many of the previous problems of the "stacked plates" designs. In such two-canister designs as the Singer assembly, one of the canisters serves as a seat while the other canister replaces various components of the stem assembly, and is moved upwardly and downwardly by the stem in relation to the bottom canister so as to open and close the main valve and form a tortuous fluid path between the apertures of the two canisters. The Singer valve is able to effectively and substantially eliminate noise and cavitation. However, this valve assembly is prone to fouling or clogging due to the use of the small round apertures in the canisters. In fact, the fluid must often be filtered before passing through the Singer valve assembly. Moreover, the fluid exiting the canisters of the Singer valve assembly is directed at the housing wall, causing erosion.

While effectively reducing noise and cavitation, these devices are not optimal. The primary disadvantage of such designs is that the valve capacity is significantly lowered, rendering these valves inapplicable in certain situations. Such valve designs also require fairly complex and expensive manufacturing and assembly.

Another problem experienced with the known anti-cavitation valve assemblies disposed within the seat area of the main or basic valve is that they do not allow the use of the same stem assembly components of an existing valve assembly. Thus, the standard valve seat, disc guide, stem, disc retainer, diaphragm, diaphragm washer, etc. must be replaced with the new assembly when retrofitting an existing main or basic valve. It would be advantageous and beneficial to customers wanting to add an anti-cavitation feature to an existing main or basic valve. It would be particularly advantageous and beneficial if the customer could use their existing stem assembly and simply swap out the standard seat with an anti-cavitation seat.

Accordingly, there is a continuing need for an anti-cavitation valve assembly which uses the same stem assembly components of the existing valve, and which can be used in retrofitting existing valves. The present invention fulfills these needs, and provides other related advantages.

SUMMARY OF THE INVENTION

The present invention resides in an anti-cavitation seat which is positionable between an inlet and an outlet of a main valve and relative a non-anti-cavitation disc of a stem assembly so as to cooperate with the disc in opening and closing fluid flow between the inlet and the outlet of the main valve. As such, the anti-cavitation seat of the present invention can be inserted in place of the standard non-anti-cavitation seat, in order to impart anti-cavitation characteristics to the main valve.

The anti-cavitation seat generally comprises a first wall extending from a base and having a plurality of spaced apart apertures formed therein. A second wall also extends from the base and is spaced apart from the first wall, so as to define an outer chamber between the first and second walls. The second wall also defines an inner chamber of the seat. The second wall has a plurality of spaced apart apertures formed therein. Preferably, the apertures of the first and second wall are offset from one another, forming a tortuous fluid flow pathway between the apertures of the first wall and the apertures of the second wall.

The apertures of the second wall are arranged such so as to direct the fluid into the inner chamber such that the fluid flow from the second wall apertures converges in the inner chamber. In a particularly preferred embodiment, the apertures of the first and second walls are elongated slots.

A hollow post extends from the base and into the inner chamber. The post includes apertures formed therein permitting fluid to pass through the post and into the inner chamber. Typically, the apertures of the post and the apertures of the second wall are arranged such that fluid flowing from at least a plurality of the post apertures and the second wall apertures converges within the inner chamber. Thus, at least a plurality of the apertures of the post and the apertures of the second wall are generally aligned with one another. The post may include an opening adapted to receive a stem of the stem assembly of the main valve therein.

The seat includes a peripheral lip at an upper end of the first and second walls which is configured to engage the disc of the stem assembly, in order to close fluid flow through the main valve.

In order to convert a non-anti-cavitation main valve in to an anti-cavitation main valve, the main valve, having a fluid inlet and a fluid outlet and a non-anti-cavitation seat disposed between the fluid and the fluid outlet and aligned with a non-anti-cavitation stem assembly disc is provided. The non-anti-cavitation seat is removed, and the anti-cavitation seat is installed in its place. The non-anti-cavitation stem assembly disc and the anti-cavitation seat cooperatively act to open and close fluid flow between the inlet and outlet of the main valve.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in an anti-cavitation seat, generally referred to by the reference numbers 100 and 200 herein, which impart anti-cavitation and noise-reducing characteristics to a main valve 10.

Figure 1:
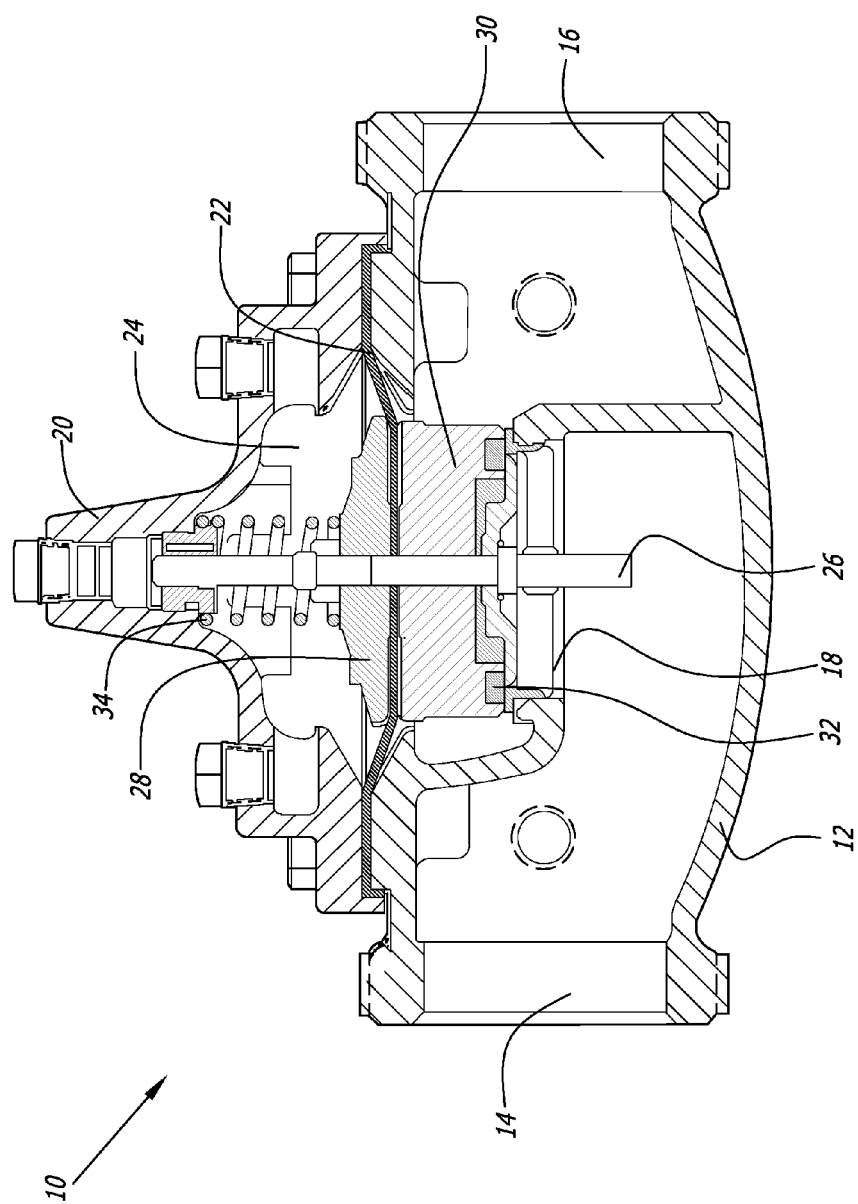
FIG. 1 is a cross-sectional view of a prior art main valve having a non-anti-cavitation seat and stem assembly.
Figure 2:
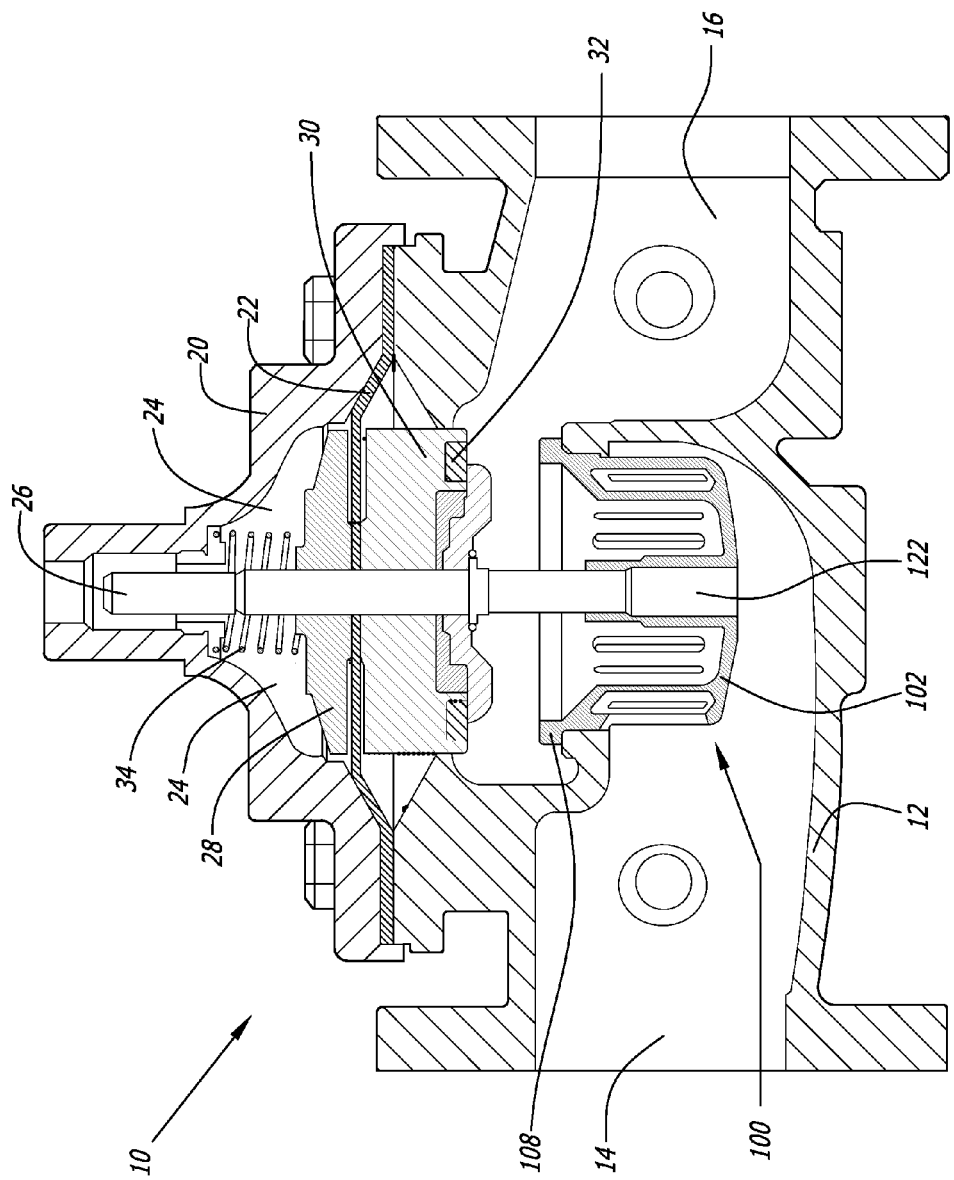
FIG. 2 is a cross-sectional view of a main valve, similar to FIG. 1, but having an anti-cavitation seat positioned between the inlet and outlet of the main valve, in accordance with the present invention.

With reference to FIG. 2, a main valve 10, sometimes referred to as a basic valve, fluid control valve or pressure reducing valve, is illustrated which is similar to the main valve of FIG. 1. As such, the main valve 10 includes a body 12 having a fluid inlet 14 and a fluid outlet 16. A cover 20 and a flexible diaphragm 22 cooperatively form a pressure chamber 24. A stem assembly, including a slidable stem 26, diaphragm washer 28, disc retainer 30, disc 32 and biasing spring 34 are all standard and present, as illustrated and explained above with respect to FIG. 1. It should be noted that the components of the standard stem assembly do not have anti-cavitation or noise-reducing characteristics. In fact, utilizing the standard, non-anti-cavitation seat 18, as illustrated in FIG. 1, the main valve 10 is susceptible to large pressure drops and fluid flows, which can create cavitation and noise. Such can be destructive to the components of the valve 10.

As indicated above, the prior art utilizes apertured plates disposed upstream and/or downstream of the main valve 10, or cooperating apertured canisters which are placed between the inlet 14 and outlet 16 of the main valve 10 in place of the standard, non-anti-cavitation stem assembly 26-34 and seat 18, and which slide relative to one another so as to form a tortuous fluid path so as to break apart the flow and force of the fluid, these systems are complicated and expensive. Moreover, the prior art assemblies and systems do not lend themselves to retrofitting of existing main valves. Furthermore, they do not avail themselves of the components which are standard within the main valve 10, such as the components of the stem assembly 26-34.

Thus, as illustrated in FIG. 2, the present invention overcomes these obstacles and disadvantages by replacing the standard, non-anti-cavitation seat 18 with a seat 100 which has anti-cavitation and noise-reducing characteristics. This anti-cavitation seat 100 is illustrated in place of the standard seat 18, between the inlet 14 and outlet 16 of the main valve 10. As will be appreciated by those skilled in the art, the anti-cavitation seat 100 of the present invention enables the easy and cost-effective retrofitting of existing valve assemblies by simply replacing the seat 18 of the valve 10, while using the existing stem assembly components 26-34, the anti-cavitation seat 100 cooperatively opening and closing the main valve 10 with the stem assembly, and particularly the disc 32, as will be more fully described herein.

Figure 3:
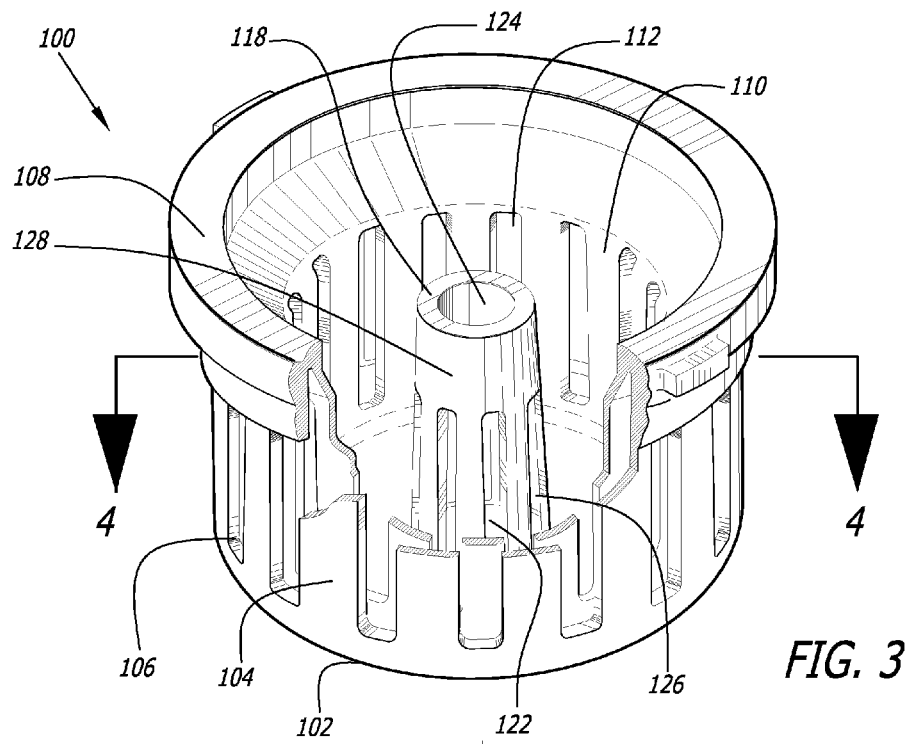
FIG. 3 is a partially sectioned perspective view of the anti-cavitation seat of FIG. 2.
Figure 4:
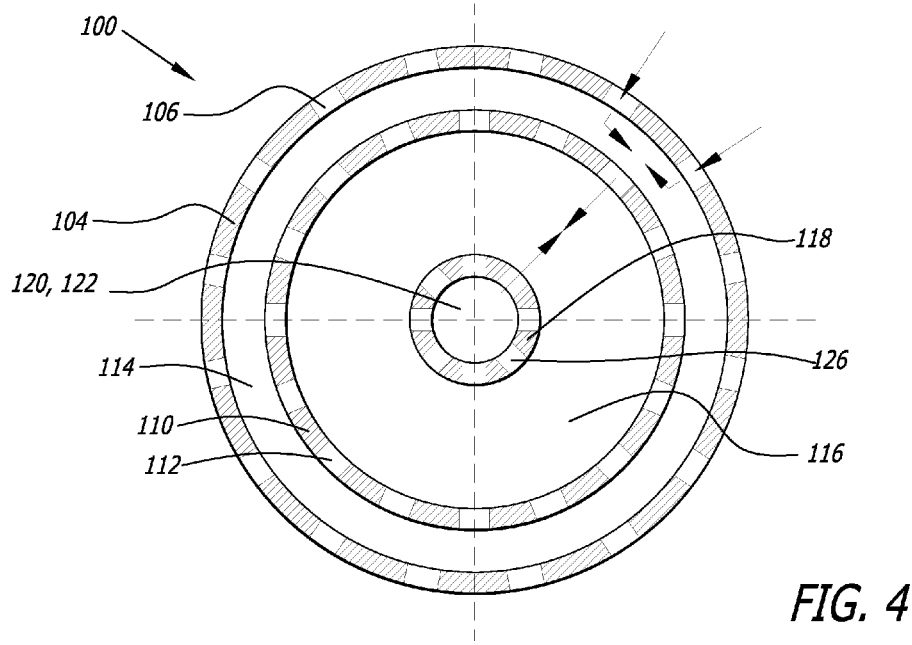
FIG. 4 is a cross-sectional view taken generally along line 4-4 of FIG. 3, illustrating fluid flow through the anti-cavitation seat, in accordance with the present invention.

With reference now to FIGS. 3 and 4, the anti-cavitation seat 100 is illustrated as a generally cylindrical body. The seat 100 includes a base 102 from which extends a first wall 104 having a plurality of spaced apart inlet apertures 106 formed therein. The first wall 104 extends upwardly to a circumferential lip 108, which is configured and adapted to engage the stem assembly, and more typically the disc 32 of the stem assembly in order to close the main valve 10.

Although the apertures 106 may have various configurations, in a particularly preferred embodiment the apertures 106 comprise elongated slots having a greater length than a width. The elongated slots 106 preferably extend along a significant portion of the length or height of the first wall 104, and are of such a diameter so as to be capable of allowing a fairly large volume of fluid to flow therethrough. Typically, as illustrated in FIGS. 3 and 4, the inlet apertures 106 are spaced apart from one another, such as generally equidistantly separated from one another, around the entire periphery of the first wall 104. However, the invention contemplates other arrangements as needed or desired. One of the benefits of utilizing elongated slots as the inlet apertures 106 is that the relatively large elongated slots 106 are not prone to clogging, as would be the case with smaller round apertures and the like.

With continuing reference to FIGS. 3 and 4, a second wall 110 extends upwardly from the base 102 in spaced relation to the first wall 104, and generally concentric therewith, as illustrated. The second wall 110 also has a plurality of aperture inlets 112 formed therein. These inlet apertures 112 are typically similar to that described above with the first wall apertures 106. As such, they are typically and preferably elongated slots in configuration and extend substantially the length or height of the second wall 110, as illustrated. Furthermore, the inlet apertures 112 are spaced apart from one another about the periphery of the wall 110. Typically, the inlet apertures 112 of the second wall 110 are similar to that described above with respect to the first wall apertures 106, except they are offset axially with the outer slots 106 such that fluid flow is diverted in a non-direct path between the outer and inner apertures 106 and 112.

An initial or outer chamber 114 is created between the first wall 104 and the second wall 110. This outer chamber is defined by the first wall 104 and second wall 110, and its dimensions are dictated by the spacing between the first and second walls 104 and 110, and the height of the first and second walls 104 and 110. As such, the outer chamber 114 is generally defined by the inner surface of wall 104 and the outer surface of wall 110. Typically, the outer chamber 114 is generally cylindrical, and annular in cross-section, as illustrated in FIG. 4.

The seat 100 and main valve 10 of the present invention are typically utilized in high-pressure environments, such as municipal water supply lines and the like. With reference to FIG. 4, when the water or other fluid comes into contact with the seat 100, it flows through the inlet apertures 106 of the first wall 104, as illustrated by the directional arrows in FIG. 4. The apertures 106 of the first wall 104 and the apertures 112 of the second wall 110 are preferably offset from one another, as illustrated in FIGS. 3 and 4, such that the fluid must flow into the outer chamber 114 and then through the inlet apertures 112 of the second wall 110. This forms a tortuous path which slows the velocity of the fluid and removes energy from the fluid.

The fluid then flows from the inlet apertures 112 of the second wall 110 into an inner chamber 116 of the seat 100, defined by the inner surface of the second wall 110. As the apertures 112 of the second wall 110 are spaced apart from one another and formed along the periphery of the second wall 110, the fluid is directed towards the center of the inner chamber 116, where it converges upon itself and loses additional energy and force. This converging fluid area within the inner chamber 116 causes the fluid to be directed into itself where any potential cavitation occurs away from component surfaces. The convergence of the fluid flow also dissipates energy, which allows the maximum pressure drop to occur in the inner chamber 116, rather than at the outlet of the seat or in other areas within the main valve 10. By having a small pressure drop zone across the seat 100, the likelihood of creating a damaging cavitation condition is reduced or eliminated.

With continuing reference to FIGS. 3 and 4, in a particularly preferred embodiment, the anti-cavitation seat 100 also includes a hollow post 118 extending upwardly from the base 102 and into the inner chamber 116. Typically, as illustrated, the hollow post 118 is generally centered within the seat 100 and as such forms a central axial chamber 120. This chamber 120 is accessible through an aperture 122 formed in the base 102. Typically, the post 118 also includes an aperture 124 formed at a top end thereof and configured to allow the stem 26 of the stem assembly to slidably be inserted therethrough, as illustrated in FIG. 2.

Fluid apertures 126 are formed in the wall of the post 118, as illustrated in FIGS. 3 and 4. These apertures 126 are preferably elongated slots, as illustrated. The apertures 126 are formed around a periphery of the wall 128 of the post 118, so as to communicate fluid between the central axial chamber 120 of the hollow post 118 and the inner chamber 116. Thus, as fluid encounters the seat 100, the fluid enters the central axial chamber 120 of the hollow post 118, by means of aperture 122 in the base 102, and flow out of the radial apertures 126 of the stem wall 128, so as to enter the inner chamber 116.

As illustrated in FIG. 4, the fluid exiting the hollow post 118, through apertures 126, converges with the fluid exiting from the apertures 112 of the inner second wall 110, dissipating fluid energy, and allowing maximum pressure drop to occur in the inner chamber 116, rather than at the outlet of the seat or other areas of the main valve 10. At least some of the apertures 126 of the post 118 may be generally aligned with some of the apertures 112 of the inner second wall 110 so as to maximize this effect. This is illustrated by directional fluid flow areas in FIG. 4 meeting within the inner chamber 116 of the seat 100. Typically, the post 118 extends at or below the lip 108, and the upper aperture 124 is generally closed off by the stem 26, so as to force the fluid through the peripheral apertures 126 of the post 118. The plurality of apertures 126 formed around the post 118 also permit additional fluid to converge within the inner chamber 116, increasing the total capacity of fluid through the valve. This permits increasing flow capacity without diminishing anti-cavitation properties, which cannot be accomplished with prior art anti-cavitation designs.

With reference again to FIG. 2, with the main valve open 10, as illustrated, and the stem assembly, and particularly disc 32, moved away from the seat 100, the fluid flowing from the inlet 14 of the valve 10 encounters the anti-cavitation seat 100, as described above, and by means of breaking up the fluid flow and forcing the fluid to converge upon itself, as described above, energy is dissipated and damaging cavitation conditions are reduced or eliminated, as the fluid flows from the seat 100, through the valve 10 and out outlet 16 of the main valve 10. However, when the stem assembly is lowered, such that disc 32 comes into engagement with upper lip 108 of the anti-cavitation seat 100, fluid is not allowed to flow from the inlet 14 to the outlet 16 of the main valve 10.

Figure 5:
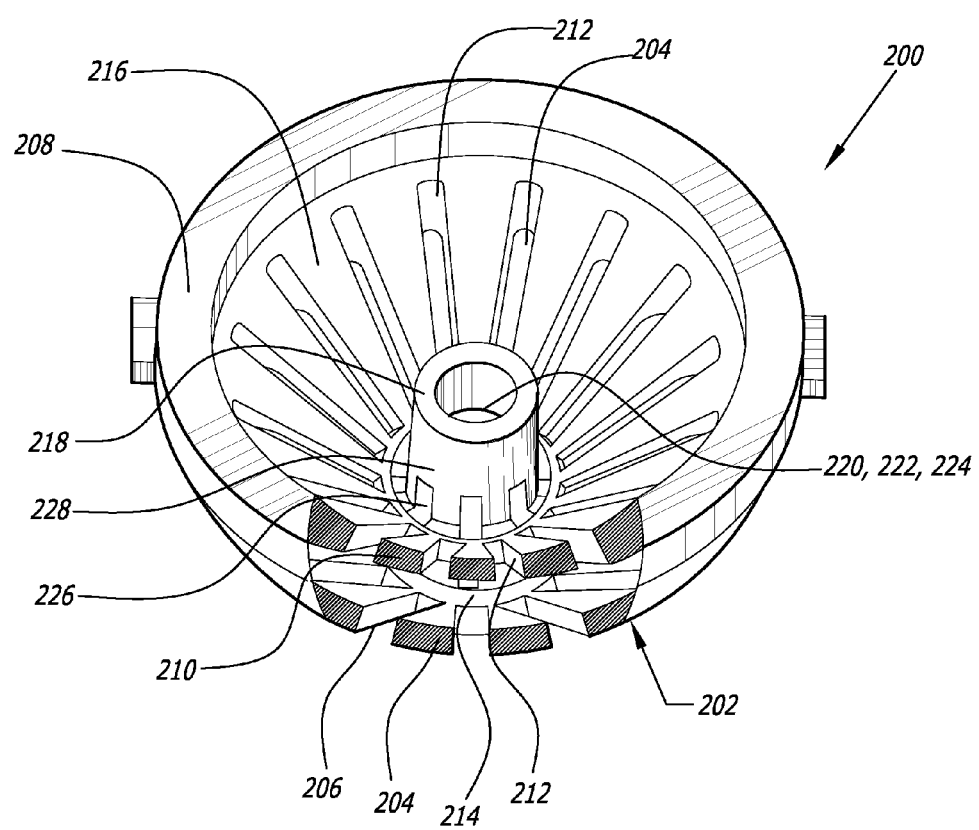
FIG. 5 is a partially sectioned perspective view of another anti-cavitation seat embodying the present invention.
Figure 6:
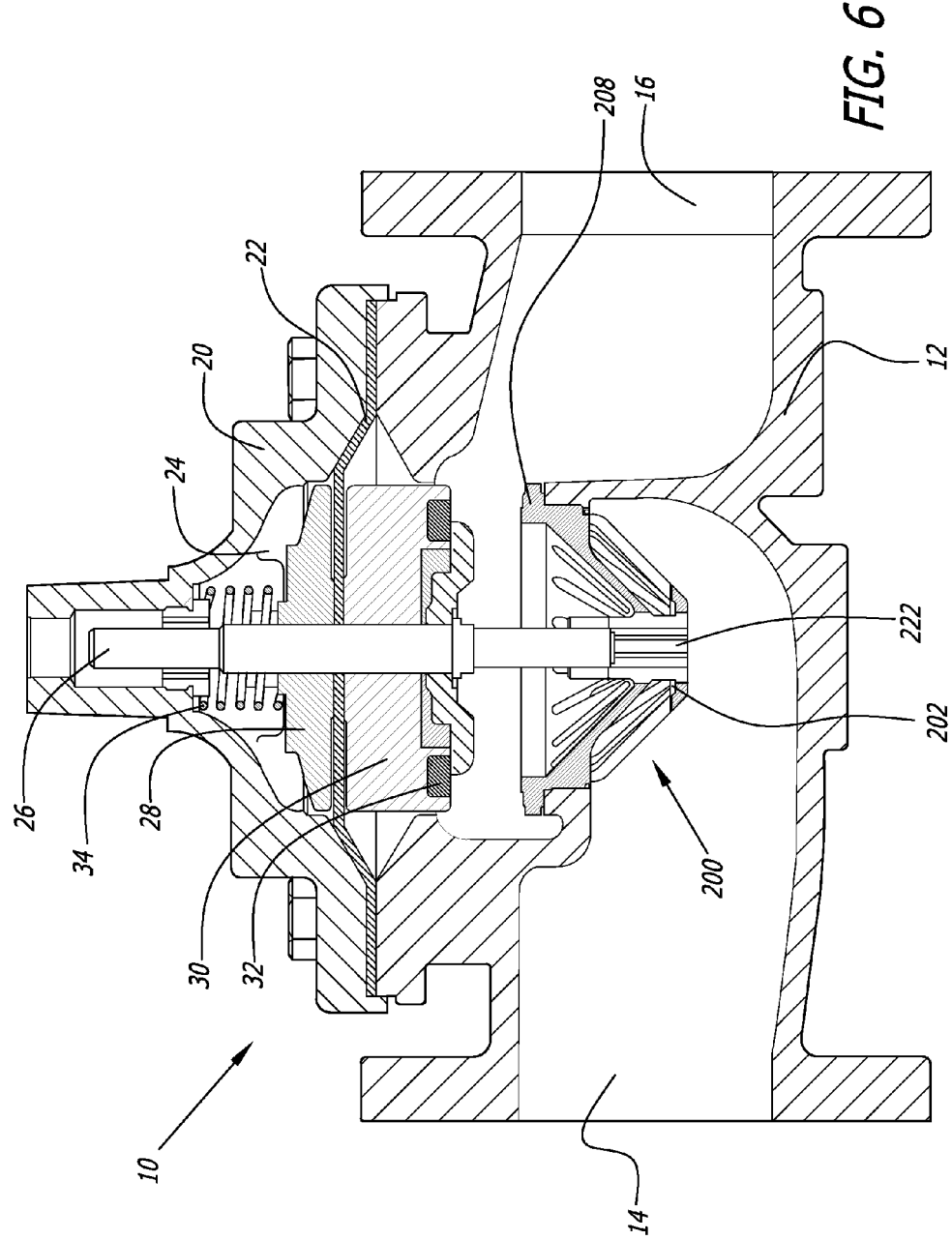
FIG. 6 is a cross-sectional view of a main valve having the anti-cavitation seat of FIG. 5 disposed therein, and in an open state.
Figure 7:
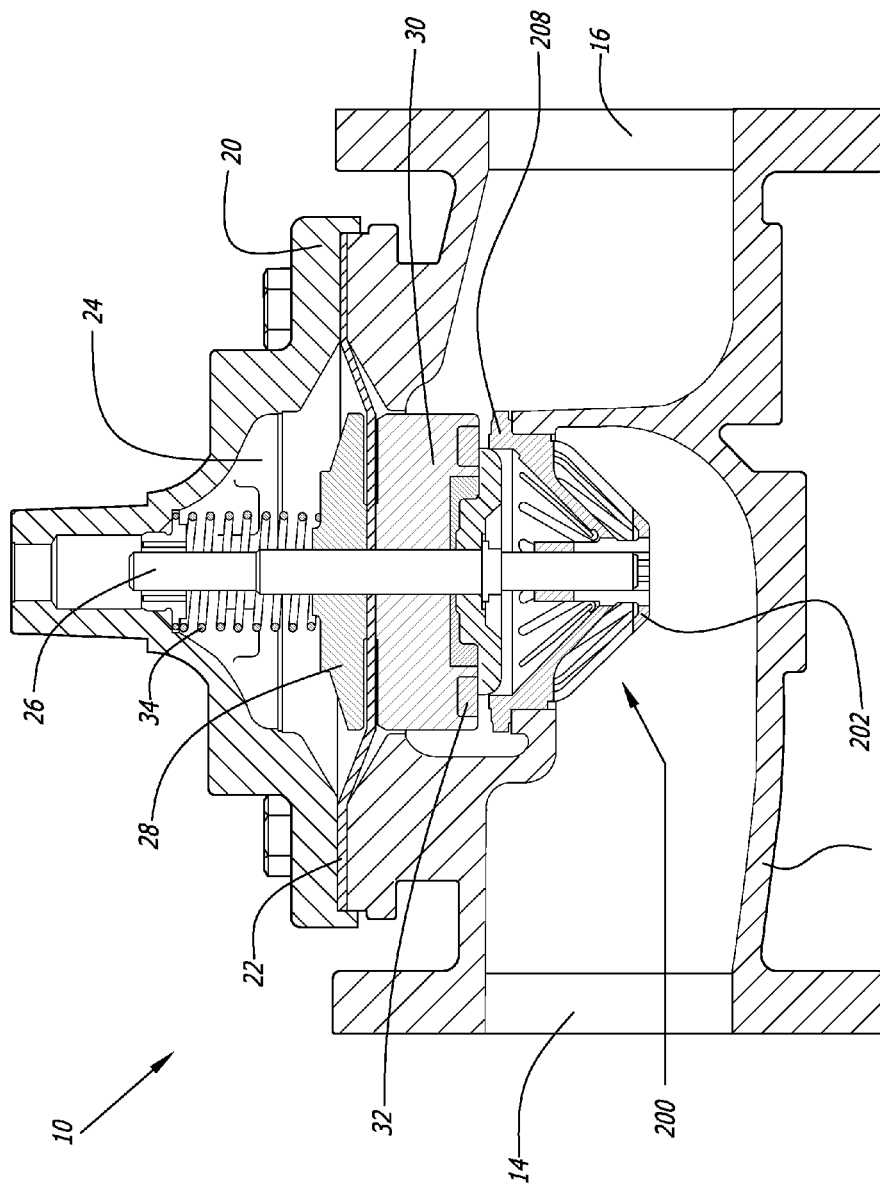
FIG. 7 is a cross-sectional view of the main valve of FIG. 6, in a nearly closed state.

With reference now to FIGS. 5-7, while the anti-cavitation seat 100 in FIGS. 2-4 is illustrated as being generally cylindrical, it will be appreciated by those skilled in the art that other configurations are possible and still achieve the same benefits and purposes of the invention. For example, an anti-cavitation seat 200 is illustrated in FIG. 5 which has a generally frustroconical or bowl-shape configuration, but which is otherwise structurally similar to the anti-cavitation seat 100 illustrated in FIG. 3. A benefit of the configuration of a conical profile is to allow for a more uniform distribution entry flow area into the seat chamber cavities. A conical profile used in prior art anti-cavitation designs, such as Singer, cannot utilize a conical feature without diminishing the effect of their anti-cavitation properties.

The anti-cavitation seat 200 includes a base 202 from which extend first and second spaced apart walls 204 and 210, each having spaced apart fluid apertures 206 and 212 formed therein, typically as described above. The spaced apart walls 204 and 210 create a first, outer chamber 214, and the inner second wall 210 forms an inner chamber 216. The walls 204 and 210 extend upwardly from a base 202 to a peripheral upper lip 208, which is configured to engage the stem assembly, as described above. A hollow post 218 extends upwardly from the base 202 into the inner chamber 216, and has an inlet 222 formed in the base 202, which provides access of the fluid to a central axial chamber 220, typically having an upper aperture 224 into which the stem 26 of the stem assembly is insertable. Spaced apart, peripheral apertures 226 are formed in the wall 228 of the post 218. The general arrangement and function of these components and structure is similar to that described above with respect to the anti-cavitation seat 100 illustrated and described with respect to FIGS. 3 and 4. In this case, however, the reference numbers are increased by 100, e.g., 100 to 200, for purposes of illustration and explanation of the different configuration of the anti-cavitation seat 200.

With reference now to FIG. 6, a main valve 10 having the anti-cavitation seat 200 of FIG. 5 installed therein is shown. The standard, non-anti-cavitation stem assembly has been moved upwardly and away from the seat 200, so as to open the valve 10 and allow fluid flow from the inlet 14 to the outlet 16 of the main valve 10. Disruption in anti-cavitation of the fluid occurs through the seat 200, as described above.

However, when the fluid pressure within pressure chamber 24 is proportionally less than valve inlet 14 pressure and proportionally greater than the outlet 16 pressure with assistance of spring 34, the stem assembly is moved downwardly towards the anti-cavitation seat 200, as illustrated in FIG. 7. In FIG. 7, the main valve 10 is only partially opened, such as approximately ten percent open. Thus, fluid is still allowed to flow through the anti-cavitation seat, to outlet 16. However, if the fluid pressure within chamber 24 is increased, the stem assembly will move downwardly into contact with the anti-cavitation seat 200, such that the disc 32 comes into contact with lip 208, or any other sealing component of the stem assembly into contact with the lip 208 or upper sealing portion of the anti-cavitation valve 200, so as to close the valve 10 and prevent fluid from flowing between the inlet 14 and the outlet 16.

It will be appreciated that there are benefits relating to convenience, ease of retrofitting, and a less complex and costly arrangement of components by simply removing the standard, non-anti-cavitation seat 18 and replacing it with an anti-cavitation seat 100 or 200 of the present invention, while retaining the other components of the main valve 10, and particularly the standard, non-anti-cavitation components of the stem assembly. Not only are there benefits with retrofitting existing valves, but there are also advantages in incorporating the anti-cavitation seat 100 or 200 of the present invention into new valves while maintaining the standard components of the valve 10.

Although several embodiments have been described in detail for purposes of illustration, various modifications may be made without departing from the scope and spirit of the invention. Accordingly, the invention is not to be limited, except as by the appended claims.

What is claimed is:

1. An anti-cavitation seat fixedly positionable between an inlet and an outlet of a main valve and relative a movable non-anti-cavitation disc of a stem assembly so as to cooperate with the disc in opening and closing fluid flow between the inlet and the outlet of the main valve, the anti-cavitation seat comprising:
   a first wall having a plurality of spaced apart apertures formed therein;
   a second wall spaced apart from the first wall along at least a portion thereof and defining an outer chamber between the first and second walls, and an inner chamber, the second wall having a plurality of spaced apart apertures formed therein;
   a peripheral lip at an upper end of the first and second walls configured to engage the non-anti-cavitation disc of the stem assembly when the non-anti-cavitation disc is moved into a closed position;
   wherein a tortuous fluid flow pathway is formed between the outside of the apertures of the first wall and the inside of the apertures of the second wall; and
   wherein the apertures of the second wall are arranged so as to direct fluid into the inner chamber such that fluid flow from the second wall apertures converges in the inner chamber.

2. The anti-cavitation seat of claim 1, wherein the apertures of the first wall are elongated slots.

3. The anti-cavitation seat of claim 1, wherein the apertures of the second wall are elongated slots.

4. The anti-cavitation seat of claim 1, wherein the apertures of the second wall are offset from the apertures of the first wall.

5. The anti-cavitation seat of claim 1, including a base from which the first and second walls extend.

6. The anti-cavitation seat of claim 5, including a hollow post extending from the base into the inner chamber in spaced relation to the second wall, the post and the second wall at least partially defining the inner chamber therebetween.

7. The anti-cavitation seat of claim 6, wherein the post includes apertures formed therein permitting fluid to pass through the post and into the inner chamber.

8. The anti-cavitation seat of claim 7, wherein the apertures of the post and the apertures of the second wall are arranged to converge fluid flowing from at least a plurality of the post apertures and second wall apertures.

9. The anti-cavitation seat of claim 8, wherein at least a plurality of the apertures of the post and the apertures of the second wall are generally aligned opposite one another such that fluid flowing from apertures of the post is generally directed towards fluid flowing from the apertures of the second wall.

10. The anti-cavitation seat of claim 6, wherein the apertures of the post allow for increased flow capacity through the seat as the valve opens without diminishing anti-cavitation properties of the seat.

11. The anti-cavitation seat of claim 6, wherein the post includes an opening adapted to receive a stem of a stem assembly of the main valve therein.

12. An anti-cavitation seat fixedly positionable between an inlet and an outlet of a main valve and relative a movable non-anti-cavitation disc of a stem assembly so as to cooperate with the disc in opening and closing fluid flow between the inlet and the outlet of the main valve, the anti-cavitation seat comprising:
   a first wall having a plurality of spaced apart apertures formed therein;
   a second wall spaced apart from the first wall at least along a portion thereof so as to define an outer chamber between the first and second walls, the second wall having a plurality of spaced apart apertures formed therein;
   a base from which the first and second walls extend;
   a hollow post extending from the base into the inner chamber in spaced relation to the second wall so as to at least partially define an inner chamber therebetween, the post including apertures formed therein permitting fluid to pass through the post and into the inner chamber;
   wherein the apertures of the post and the apertures of the second wall are arranged to direct fluid flowing from at least a plurality of the post apertures towards fluid flowing from second wall apertures such that the fluid flows converge in the inner chamber therebetween.

13. The anti-cavitation seat of claim 12, wherein a tortuous fluid flow pathway is formed between the outside of the apertures of the first wall and the inside of the apertures of the second wall.

14. The anti-cavitation seat of claim 13, wherein the apertures of the second wall are offset from the apertures of the first wall.

15. The anti-cavitation seat of claim 12, wherein the apertures of the first wall are elongated slots.

16. The anti-cavitation seat of claim 12, wherein the apertures of the second wall are elongated slots.

17. The anti-cavitation seat of claim 12, including a peripheral lip at an upper end of the first and second walls configured to engage the disc of the stem assembly.

18. The anti-cavitation seat of claim 12, wherein at least a plurality of the apertures of the post and the apertures of the second wall are generally aligned opposite one another.

19. The anti-cavitation seat of claim 12, wherein the post includes an opening adapted to receive a stem of a stem assembly of the main valve therein.

20. A method of converting a non-anti-cavitation main valve into an anti-cavitation main valve, comprising the steps of:
   providing a main valve having a fluid inlet and a fluid outlet and a non-anti-cavitation seat disposed between the fluid inlet and the fluid outlet and aligned with a non-anti-cavitation stem assembly disc, the seat and the disc cooperatively acting to open and close fluid flow between the inlet and the outlet of the main valve;
   removing the non-anti-cavitation seat; and
   installing an anti-cavitation seat including a first wall having a plurality of apertures and a second wall spaced apart from the first wall and having a plurality of apertures, the first and second walls defining a tortuous fluid flow pathway from the apertures of the first wall to the apertures of the second wall and the apertures of the second wall are arranged so as to converge fluid flow in an inner chamber defined by the second wall, wherein the non-anti-cavitation stem assembly disc and the anti-cavitation seat cooperatively act to open and close fluid flow between the inlet and the outlet of the main valve.

21. The method of claim 20, wherein the apertures of the first and second walls of the anti-cavitation seat comprise spaced apart elongated slots.

22. The method of claim 20, wherein the installing step includes the step of installing an anti-cavitation seat further including a hollow post extending from a base into the inner chamber and having apertures for passing fluid into the inner chamber so as to converge with at least a portion of the fluid passing through the apertures of the second wall.

23. An anti-cavitation seat positionable between an inlet and an outlet of a main valve and relative a non-anti-cavitation disc of a stem assembly so as to cooperate with the disc in opening and closing fluid flow between the inlet and the outlet of the main valve, the anti-cavitation seat comprising:
   a first wall having a plurality of spaced apart apertures formed therein; and
   a second wall spaced apart from the first wall and defining an outer chamber between the first and second walls, and an inner chamber, the second wall having a plurality of spaced apart apertures formed therein; and
   a base from which the first and second walls extend; and
   a hollow post extending from the base into the inner chamber, wherein the post includes apertures formed therein permitting fluid to pass through the post and into the inner chamber;
   wherein a tortuous fluid flow pathway is formed between the outside of the apertures of the first wall and the inside of the apertures of the second wall;
   wherein the apertures of the second wall are arranged so as to direct fluid into the inner chamber such that fluid flow from the second wall apertures converges in the inner chamber; and
   wherein the apertures of the post allow for increased flow capacity through the seat as the valve opens without diminishing anti-cavitation properties of the seat.

24. The anti-cavitation seat of claim 23, wherein the apertures of the first wall are elongated slots.

25. The anti-cavitation seat of claim 23, wherein the apertures of the second wall are elongated slots.

26. The anti-cavitation seat of claim 23, wherein the apertures of the second wall are offset from the apertures of the first wall.

27. The anti-cavitation seat of claim 23, including a peripheral lip at an upper end of the first and second walls configured to engage the disc of the stem assembly.

28. The anti-cavitation seat of claim 23, wherein the apertures of the post and the apertures of the second wall are arranged to converge fluid flowing from at least a plurality of the post apertures and second wall apertures.

29. The anti-cavitation seat of claim 28, wherein at least a plurality of the apertures of the post and the apertures of the second wall are generally aligned with one another.

30. The anti-cavitation seat of claim 23, wherein the post includes an opening adapted to receive a stem of a stem assembly of the main valve therein.

31. An anti-cavitation seat positionable between an inlet and an outlet of a main valve and relative a non-anti-cavitation disc of a stem assembly so as to cooperate with the disc in opening and closing fluid flow between the inlet and the outlet of the main valve, the anti-cavitation seat comprising:
   a first wall having a plurality of spaced apart apertures formed therein; and
   a second wall spaced apart from the first wall and defining an outer chamber between the first and second walls, and an inner chamber, the second wall having a plurality of spaced apart apertures formed therein; and
   a base from which the first and second walls extend; and a hollow post extending from the base into the inner chamber;

wherein a tortuous fluid flow pathway is formed between the outside of the apertures of the first wall and the inside of the apertures of the second wall;

wherein the apertures of the second wall are arranged so as to direct fluid into the inner chamber such that fluid flow from the second wall apertures converges in the inner chamber; and wherein the post includes an opening adapted to receive a stem of a stem assembly of the main valve therein.

32. The anti-cavitation seat of claim 31, wherein the apertures of the first wall are elongated slots.

33. The anti-cavitation seat of claim 31, wherein the apertures of the second wall are elongated slots.

34. The anti-cavitation seat of claim 31, wherein the apertures of the second wall are offset from the apertures of the first wall.

35. The anti-cavitation seat of claim 31, including a peripheral lip at an upper end of the first and second walls configured to engage the disc of the stem assembly.

36. The anti-cavitation seat of claim 31, wherein the post includes apertures formed therein permitting fluid to pass through the post and into the inner chamber.

37. The anti-cavitation seat of claim 36, wherein the apertures of the post and the apertures of the second wall are arranged to converge fluid flowing from at least a plurality of the post apertures and second wall apertures.

38. The anti-cavitation seat of claim 36, wherein at least a plurality of the apertures of the post and the apertures of the second wall are generally aligned with one another.

39. The anti-cavitation seat of claim 31, wherein the apertures of the post allow for increased flow capacity through the seat as the valve opens without diminishing anti-cavitation properties of the seat.

* * * * *